(12) United States Patent
Glahn et al.

(10) Patent No.: US 9,097,138 B2
(45) Date of Patent: Aug. 4, 2015

(54) GAS TURBINE ENGINE BUFFER SYSTEM

(71) Applicant: United Technologies Corporation, Hartford, CT (US)

(72) Inventors: Jorn A. Glahn, Manchester, CT (US); Clifton J. Crawley, Jr., Glastonbury, CT (US); Philip S. Stripinis, Rocky Hill, CT (US); William K. Ackermann, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/044,282

(22) Filed: Oct. 2, 2013

(65) Prior Publication Data

US 2014/0060075 A1 Mar. 6, 2014

Related U.S. Application Data

(62) Division of application No. 13/362,288, filed on Jan. 31, 2012, now Pat. No. 8,794,009.

(51) Int. Cl.
| | |
|---|---|
| *F02C 6/08* | (2006.01) |
| *F01D 25/00* | (2006.01) |
| *F02C 7/18* | (2006.01) |
| *F01D 11/04* | (2006.01) |

(Continued)

(52) U.S. Cl.
CPC ............. *F01D 25/00* (2013.01); *F01D 11/04* (2013.01); *F01D 25/16* (2013.01); *F02C 6/08* (2013.01); *F02C 7/06* (2013.01); *F02C 7/12* (2013.01); *F02C 7/18* (2013.01); *F02C 7/28* (2013.01); *F02C 9/18* (2013.01); *Y02T 50/675* (2013.01); *Y10T 29/49229* (2015.01)

(58) Field of Classification Search
CPC .............. F02C 6/08; F02C 7/18; F02C 7/185; Y02T 50/675; Y02T 50/676; F01D 25/12; F01D 25/125; F01D 25/145; F01D 25/18; F01D 11/08; F01D 5/081; F01D 5/187
USPC .............. 60/39.08, 782, 785, 39.091, 39.093, 60/795, 39.83, 226.1, 226.2, 226.3; 415/115, 116, 175–179; 416/95, 95 R, 416/96 R
See application file for complete search history.

(56) References Cited

U.S. PATENT DOCUMENTS

| 3,729,957 A | * | 5/1973 | Petrie et al. .................. 60/226.1 |
| 4,497,172 A | * | 2/1985 | Smith .......................... 60/226.1 |

(Continued)

OTHER PUBLICATIONS

International Preliminary Report on Patentability for International Application No. PCT/US2013/021661 dated Aug. 14, 2014.

(Continued)

*Primary Examiner* — Craig Kim
(74) *Attorney, Agent, or Firm* — Carlson, Gaskey & Olds

(57) ABSTRACT

A gas turbine engine includes a compressor section, a combustor in fluid communication with the compressor section, a turbine section in fluid communication with the combustor, and a buffer system. The buffer system can include a first circuit that supplies a first buffer supply air and a second circuit that supplies a second buffer supply air. The first circuit can include a first bleed air supply a second bleed air supply and at least one of an ejector and a valve. The second circuit can include a third bleed air supply, a fourth bleed air supply and at least one of an ejector and a valve.

15 Claims, 7 Drawing Sheets

(51) Int. Cl.
  *F01D 25/16* (2006.01)
  *F02C 7/06* (2006.01)
  *F02C 7/12* (2006.01)
  *F02C 7/28* (2006.01)
  *F02C 9/18* (2006.01)

(56) References Cited

U.S. PATENT DOCUMENTS

| | | | |
|---|---|---|---|
| 6,550,253 | B2 | 4/2003 | Mortzheim et al. |
| 6,701,715 | B2 * | 3/2004 | Anderson et al. ............... 60/782 |
| 7,536,864 | B2 | 5/2009 | Wolfe et al. |
| 7,694,505 | B2 | 4/2010 | Schilling |
| 7,861,536 | B2 | 1/2011 | Alecu et al. |
| 8,529,189 | B2 | 9/2013 | Brown et al. |
| 2003/0033813 | A1 | 2/2003 | Flatman et al. |
| 2007/0220900 | A1 | 9/2007 | Shockling et al. |
| 2008/0112791 | A1 | 5/2008 | Lee et al. |
| 2008/0115503 | A1 | 5/2008 | Vasquez et al. |
| 2008/0317588 | A1 | 12/2008 | Grabowski et al. |
| 2009/0277155 | A1 * | 11/2009 | Bulin et al. ................. 60/226.3 |
| 2010/0092116 | A1 | 4/2010 | Franconi |
| 2010/0175387 | A1 * | 7/2010 | Foust et al. ..................... 60/782 |
| 2010/0218483 | A1 | 9/2010 | Smith |

OTHER PUBLICATIONS

International Search Report and Written Opinion for International Application No. PCT/US2013/021661 dated Sep. 26, 2013.

* cited by examiner

GAS TURBINE ENGINE BUFFER SYSTEM

CROSS-REFERENCE TO RELATED APPLICATION

This application is a divisional of U.S. patent application Ser. No. 13/362,288, filed Jan. 31, 2012.

BACKGROUND

This disclosure relates to a gas turbine engine, and more particularly to a buffer system that can communicate a buffer supply air to one or more portions of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine modes.

Gas turbine engines typically include shafts that support a plurality of airfoil supporting rotors of the compressor section and the turbine section. Generally, these shafts are supported by bearing structures that define bearing compartments. The bearing compartments house one or more bearings and contain lubricant that is used to lubricate the bearings. The lubricant is contained within the bearing compartment by one or more seals. A predetermined differential pressure must be maintained across the seals so the lubricant cannot leak past the seals.

SUMMARY

A gas turbine engine includes a compressor section, a combustor in fluid communication with the compressor section, a turbine section in fluid communication with the combustor, and a buffer system. The buffer system can include a first circuit that supplies a first buffer supply air and a second circuit that supplies a second buffer supply air. The first circuit can include a first bleed air supply a second bleed air supply and at least one of an ejector and a valve. The second circuit can include a third bleed air supply, a fourth bleed air supply and at least one of an ejector and a valve.

In a further embodiment of the foregoing gas turbine engine embodiment, one of the first circuit and the second circuit can include a conditioning device.

In a further embodiment of either of the foregoing gas turbine engine embodiments, the ejector can be a variable area ejector.

In a further embodiment of any of the foregoing gas turbine engine embodiments, the gas turbine engine can include a high bypass geared aircraft engine having a bypass ratio of greater than about six (6).

In a further embodiment of any of the foregoing gas turbine engine embodiments, the gas turbine engine includes a low fan pressure ratio of less than about 1.45.

In a further embodiment of any of the foregoing gas turbine engine embodiments, the first circuit can include one of an ejector and a valve and the second circuit can include the other of the ejector and the valve.

The various features and advantages of this disclosure will become apparent to those skilled in the art from the following detailed description. The drawings that accompany the detailed description can be briefly described as follows.

DETAILED DESCRIPTION

Figure 1:
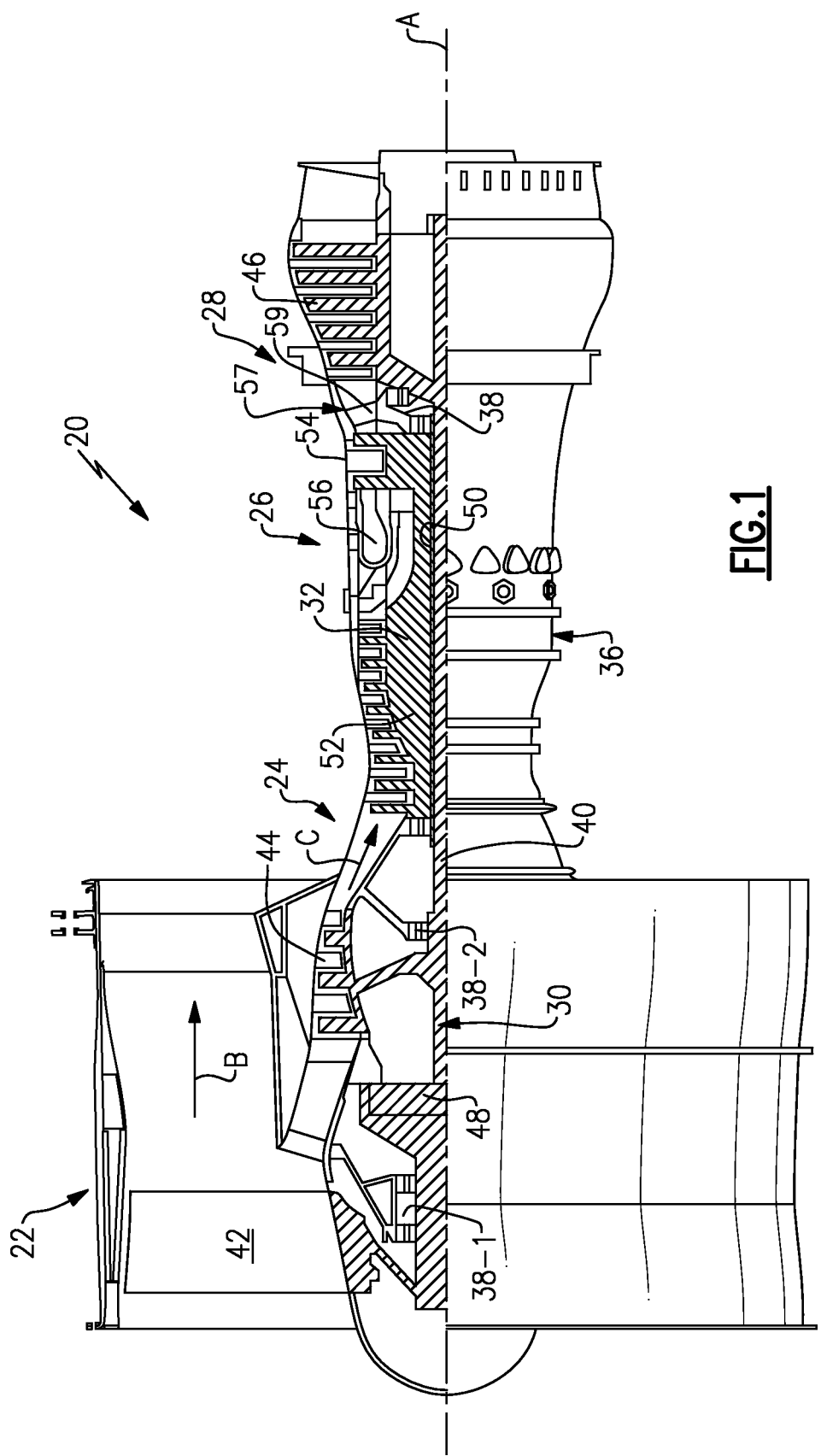
FIG. 1 schematically illustrates a cross-sectional view of a gas turbine engine.

FIG. 1 schematically illustrates a gas turbine engine 20. The gas turbine engine 20 disclosed herein is a two spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of turbine engines, including but not limited to three spool engine architectures.

The gas turbine engine 20 generally includes a low speed spool 30 and a high speed spool 32 mounted for rotation about an engine centerline longitudinal axis A relative to an engine static structure 36 via several bearing structures 38. It should be understood that various bearing structures 38 at various locations may alternatively or additionally be provided.

The low speed spool 30 generally includes an inner shaft 40 that interconnects a fan 42, a low pressure compressor 44 and a low pressure turbine 46. The inner shaft 40 can be connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54. In this example, the inner shaft 40 and the outer shaft 50 are supported at a plurality of points by bearing structures 38 positioned within the engine static structure 36. In one non-limiting embodiment, bearing structures 38 include at least a #1 bearing structure 38-1 forward of the geared architecture 48 and a #2 bearing structure 38-2 located aft of the geared architecture 48.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 can support one or more bearing structures 38 in the turbine section 28. The inner shaft 40 and the outer shaft 50 are concentric and rotate via the bearing structures 38 about the engine centerline longitudinal axis A, which is collinear with their longitudinal axes. The inner shaft 40 and the outer shaft 50 can be either co-rotating or counter-rotating with respect to one another.

The core airflow C is compressed by the low pressure compressor 44 and the high pressure compressor 52, is mixed with fuel and burned in the combustor 56, and is then expanded over the high pressure turbine 54 and the low pressure turbine 46. The mid-turbine frame 57 includes airfoils 59 which are in the core airflow path. The high pressure turbine 54 and the low pressure turbine 46 rotationally drive the respective high speed spool 32 and the low speed spool 30 in response to the expansion.

In some non-limiting examples, the gas turbine engine 20 is a high-bypass geared aircraft engine. In a further example, the gas turbine engine 20 bypass ratio is greater than about six (6:1). The geared architecture 48 of the example gas turbine engine 20 includes an epicyclic gear train, such as a planetary gear system or other gear system. The example epicyclic gear train has a gear reduction ratio of greater than about 2.3. The geared architecture 48 enables operation of the low speed spool 30 at higher speeds which can increase the operational efficiency of the low pressure compressor 44 and low pressure turbine 46 and render increased pressure in a fewer number of stages.

The low pressure turbine 46 pressure ratio is pressure measured prior to inlet of low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). The geared architecture 48 of this embodiment is an epicyclic gear train with a gear reduction ratio of greater than about 2.5:1. It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Figure 2:
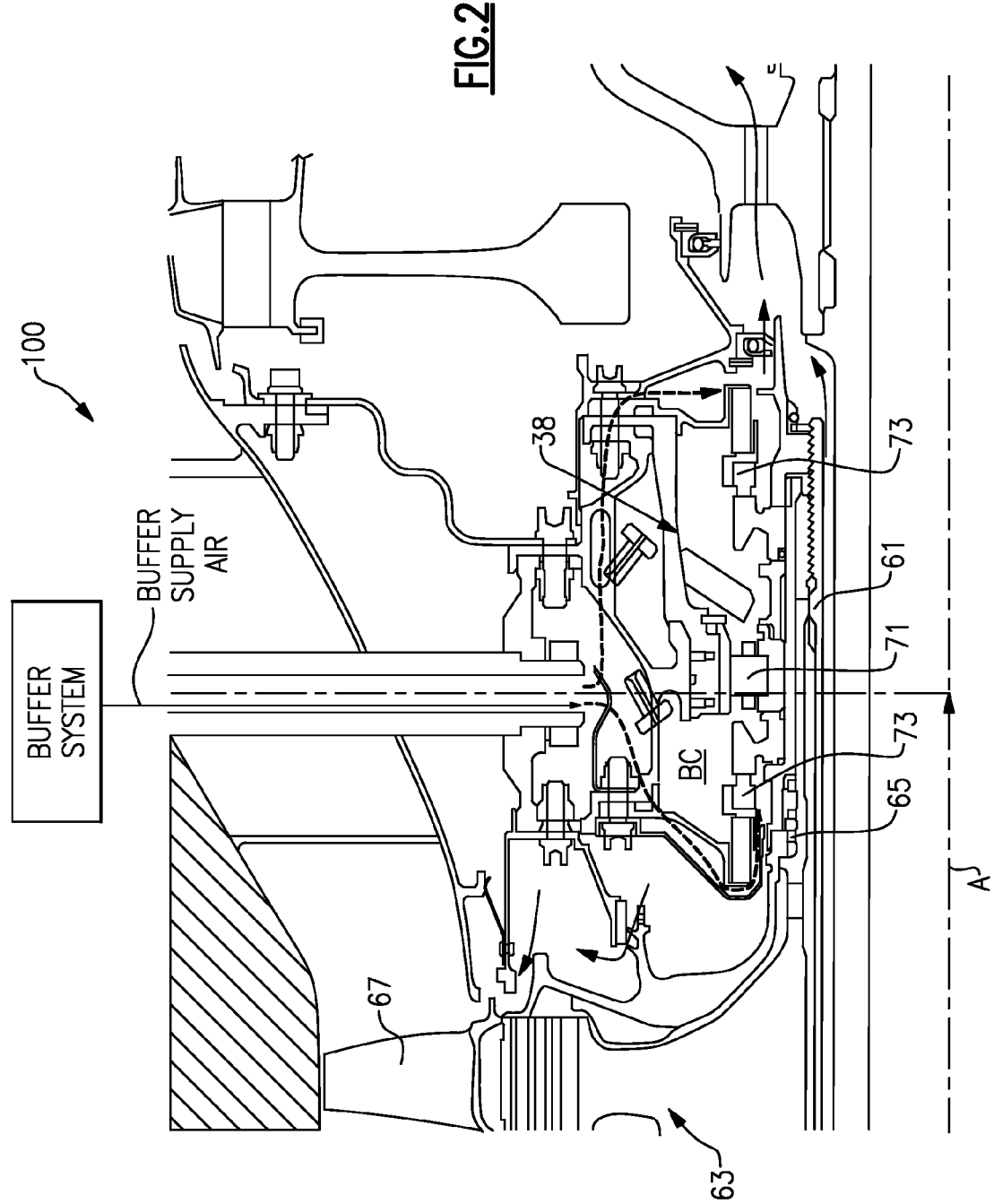
FIG. 2 illustrates a schematic cross-section of a portion of the gas turbine engine.

FIG. 2 illustrates a portion 100 of a gas turbine engine, such as the gas turbine engine 20. The portion 100 can include one or more bearing structures 38. Only one bearing structure 38 is depicted in FIG. 2 to schematically illustrate its features, but this is in no way intended to limit this disclosure.

The bearing structure 38 supports a shaft 61, such as the inner shaft 40 or the outer shaft 50, which supports a rotor assembly 63, such as a rotor assembly of the compressor section 24 or the turbine section 28, through a hub 65. The rotor assembly 63 carries at least one airfoil 67 for adding or extracting energy from the core airflow.

The bearing structure 38 defines a bearing compartment BC that houses one or more bearings 71. The bearing compartment BC contains a lubricant for lubricating (and acting as a cooling medium to) the bearings 71. One or more seals 73 (two shown) contain the lubricant within the bearing compartment BC. The seals 73 of the bearing compartment BC must be pressurized to prevent the lubricant from leaking out during certain ground and flight conditions (both steady-state and transient). A buffer system can be used to communicate buffer supply air to the bearing compartment BC in order to provide adequate pressurization of the seals 73 without exceeding material and/or lubricant temperature limitations. Example buffer systems that can be used for this and other purposes are detailed below.

Figure 3:
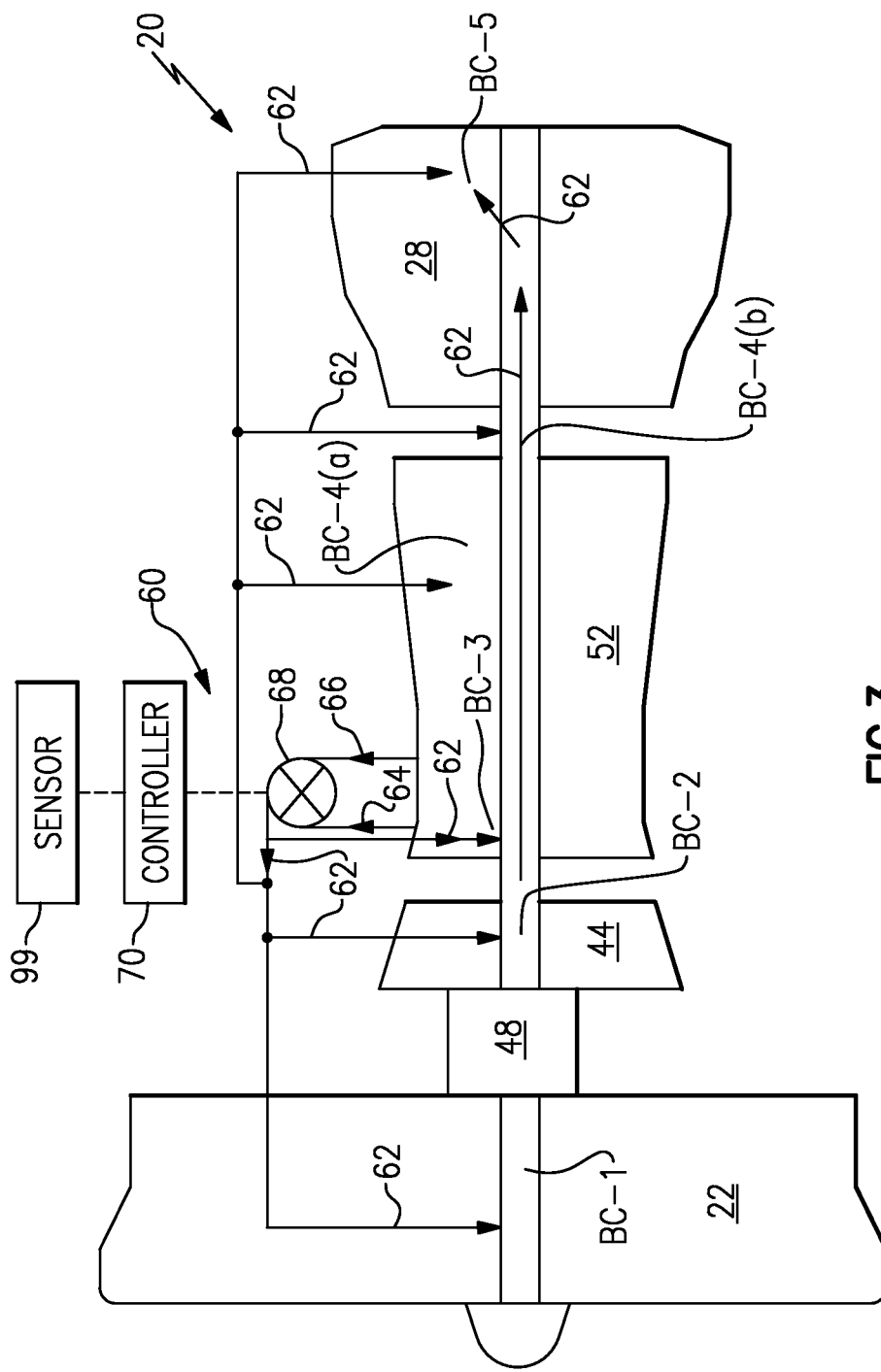
FIG. 3 illustrates an example buffer system that can be incorporated into a gas turbine engine.

FIG. 3 illustrates an example buffer system 60 that can communicate buffer supply air 62 to a portion of the gas turbine engine 20, such as to one or more bearing compartments BC. In this example, bearing compartments BC-1, BC-2, BC-3, BC-4(a), BC-4(b) and BC-5 can be fed with buffer supply air 62. The buffer supply air 62 pressurizes the bearing compartments BC and can maintain the bearing compartments BC at an acceptable temperature. Although the example embodiment illustrates communication of the buffer supply air 62 to multiple bearing compartments BC-1 through BC-5 to provide adequate bearing compartment seal pressurization to prevent lubricant leakage, buffer supply air 62 could be communicated to only a single bearing compartment or could be communicated for anti-icing, ventilation, cooling and other purposes.

The buffer system 60 includes a first bleed air supply 64 and a second bleed air supply 66. In other words, the buffer system 60 is a dual supply system. In the exemplary embodiment, the first bleed air supply 64 is a low pressure bleed air supply and the second bleed air supply 66 is a high pressure bleed air supply that includes a pressure that is greater than the pressure of the first bleed air supply 64.

The first bleed air supply 64 can be sourced from the fan section 22, the low pressure compressor 44 or the high pressure compressor 52. In the illustrated non-limiting example, the first bleed air supply 64 is sourced from an upstream stage of the high pressure compressor 52. However, the first bleed air supply 64 could be sourced from any location that is upstream from the second bleed air supply 66. The second bleed air supply 66 can be sourced from the high pressure compressor 52, such as from a middle or downstream stage of the high pressure compressor 52. The second bleed air supply 66 could also be sourced from the low pressure compressor 44 or the fan section 22 depending on from where the first bleed air supply 64 is sourced.

The buffer system 60 can also include a valve 68 that is in communication with both the first bleed air supply 64 and the second bleed air supply 66. Although shown schematically, the first bleed air supply 64 and the second bleed air supply 66 can be in fluid communication with the valve 68 via buffer tubing, conduits, or other passageways. Check valves may also be used to prevent the second bleed air supply 66 from backflowing into the first bleed air supply 64.

The valve 68 can select between the first bleed air supply 64 and the second bleed air supply 66 to communicate the buffer supply air 62 to a desired portion(s) of the gas turbine engine 20. In other words, the buffer supply air 62 that is communicated is either the first bleed air supply 64 or the second bleed air supply 66 depending on which air supply is ultimately selected by the valve 68, as is further discussed below.

The determination of whether to communicate the first bleed air supply 64 or the second bleed air supply 66 as the buffer supply air 62 is based on a power condition of the gas turbine engine 20. The term "power condition" as used in this disclosure generally refers to an operability condition of the gas turbine engine 20. Gas turbine engine power conditions can include low power conditions and high power conditions.

Example low power conditions include, but are not limited to, ground operation, ground idle and descent idle. Example high power conditions include, but are not limited to, takeoff, climb, and cruise conditions. It should be understood that other power conditions are also contemplated as within the scope of this disclosure.

In one exemplary embodiment, the valve 68 communicates the first bleed air supply 64 (which is a relatively lower pressure bleed air supply) as the buffer supply air 62 in response to identifying a high power condition of a gas turbine engine 20. The second bleed air supply 66 (which is a relatively higher pressure bleed air supply) is selected by the valve 68 and communicated as the buffer supply air 62 in response to detecting a low power condition of the gas turbine engine 20. Both the first bleed air supply 64 and the second bleed air supply 66 are intended to maintain the same minimum pressure delta across the bearing compartment seals. Low power conditions require a higher stage pressure source to contain the lubricant within the bearing compartment, while high power conditions require a lower stage pressure source. The buffer system 60 can use the lowest possible compressor stage to meet pressure requirements in order to minimize supply temperature and any performance impact to the gas turbine engine 20.

The valve 68 can be a passive valve. A passive valve operates like a pressure regulator that can switch between two or more sources without being commanded to do so by a controller, such as an engine control (EEC). The valve 68 of this example uses only a single input which is directly measured to switch between the first bleed air supply 64 and the second bleed air supply 66.

The valve 68 could also be a controller based valve. For example, the buffer system 60 can include a controller 70 in communication with the valve 68 for selecting between the first bleed air supply 64 and the second bleed air supply 66. The controller 70 is programmed with the necessary logic for selecting between the first bleed air supply 64 and the second bleed air supply 66 in response to detecting a pre-defined power condition of the gas turbine engine 20. The controller 70 could also be programmed with multiple inputs.

In one example, a sensor 99 detects a power condition of the gas turbine engine 20 and communicates a signal to the controller 70 to command modulation of the valve 68 between the first bleed air supply 64 and the second bleed air supply 66. The valve 68 could also be modulated to an intermediate level to inter-mix the first bleed air supply 64 and the second bleed air supply 66. Of course, this view is highly schematic. It should be understood that the sensor 99 and the controller 70 can be programmed to detect any power condition. Also, the sensor 99 can be replaced by any control associated with the gas turbine engine 20 or an associated aircraft. Also, although shown as a separate feature, the controller functionality could be incorporated into the valve 68.

Figure 4:
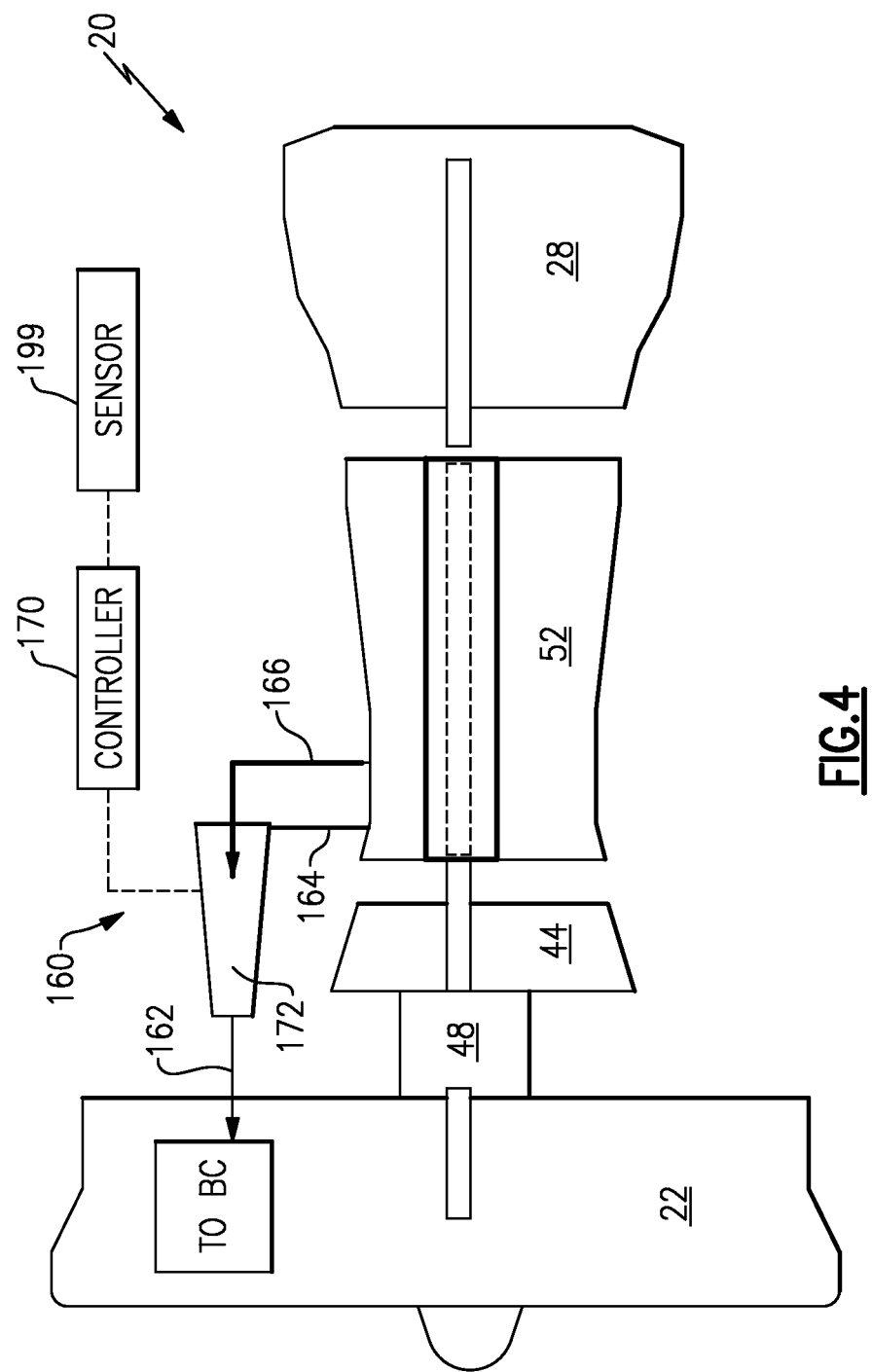
FIG. 4 illustrates another example buffer system that can be incorporated into a gas turbine engine.

FIG. 4 illustrates another example buffer system 160 that can communicate buffer supply air 162 to provide adequate bearing compartment seal pressurization at an acceptable temperature. The buffer supply air 162 can also be used for additional purposes such as anti-icing and ventilation or for other cooling requirements of the gas turbine engine 20.

The buffer system 160 includes a first bleed air supply 164, a second bleed air supply 166 and an ejector 172. If necessary, the first bleed air supply 164 can be augmented by the ejector 172 to prepare the buffer supply air 162 for communication to a portion of the gas turbine engine 20, such as a bearing compartment BC (schematically shown by FIG. 4). In other words, the ejector 172 can add pressure (using a relatively small amount of the second bleed air supply 166) to the first bleed air supply 164 to prepare the buffer supply air 162 for communication to an appropriate location of a gas turbine engine 20. In one exemplary embodiment, the ejector 172 can mix the first bleed air supply 164 of a first pressure with the second bleed air supply 166 of a second higher pressure to render the buffer supply air 162 of an intermediate pressure to the first bleed air supply 164 and the second bleed air supply 166.

The second bleed air supply 166, which is a higher pressure air than the first bleed air supply 164, can be communicated to the ejector 172 to power the ejector 172. The first bleed air supply 164 can be sourced from the fan section 22, the low pressure compressor 44 or the high pressure compressor 52. The second bleed air supply 166 can be sourced from a middle or downstream stage of the high pressure compressor 52, or can include diffuser air. The second bleed air supply 166 could also be sourced from the low pressure compressor 44 or the fan section 22 depending on from where the first bleed air supply 164 is sourced.

Augmentation of the first bleed air supply 164 prepares the buffer supply air 162 at an adequate pressure and temperature to pressurize the bearing compartment(s) BC. The determination of whether or not to augment the first bleed air supply 164 with the ejector 172 is based on a power condition of the gas turbine engine 20. Gas turbine engine power conditions can include low power conditions and high power conditions. Example low power conditions include, but are not limited to, ground operation, ground idle and descent idle. Example high power conditions include, but are not limited to, takeoff, climb, and cruise conditions. It should be understood that other power conditions are also contemplated as within the scope of this disclosure.

In one example, the first bleed air supply 164 is augmented by the ejector 172 in response to detecting a low power condition of the gas turbine engine 20 in order to communicate a buffer supply air 162 having adequate pressurization. The amount of augmentation performed on the first bleed air supply 164 can vary depending upon the type of power condition that is detected and the pressure requirements of the bearing compartment(s) BC. For example, in one embodiment, the first bleed air supply 164 is not augmented by the ejector 172 in response to detection of a high power condition of the gas turbine engine 20. In other words, the first bleed air supply 164 can be communicated as the buffer supply air 162 without any augmentation in response to some power conditions.

The buffer system 160 can include a controller 170 in communication with the ejector 172 for determining whether or not to augment the first bleed air supply 164. The controller 170 is programmed with the necessary logic for making this determination in response to detecting a pre-defined power condition of the gas turbine engine 20. In one example, a sensor 199 detects a power condition of the gas turbine engine 20 and communicates a signal to the controller 170 to command the ejector 172 to augment the first bleed air supply 64. Of course, this view is highly schematic. It should be understood that the sensor 199 and the controller 170 can be programmed to detect any power condition. Also, the sensor 199 can be replaced by any control associated with the gas turbine engine 20 or an associated aircraft. Also, although shown as a separate feature, the controller 170 functionality could be incorporated into the ejector 172.

Figure 5:
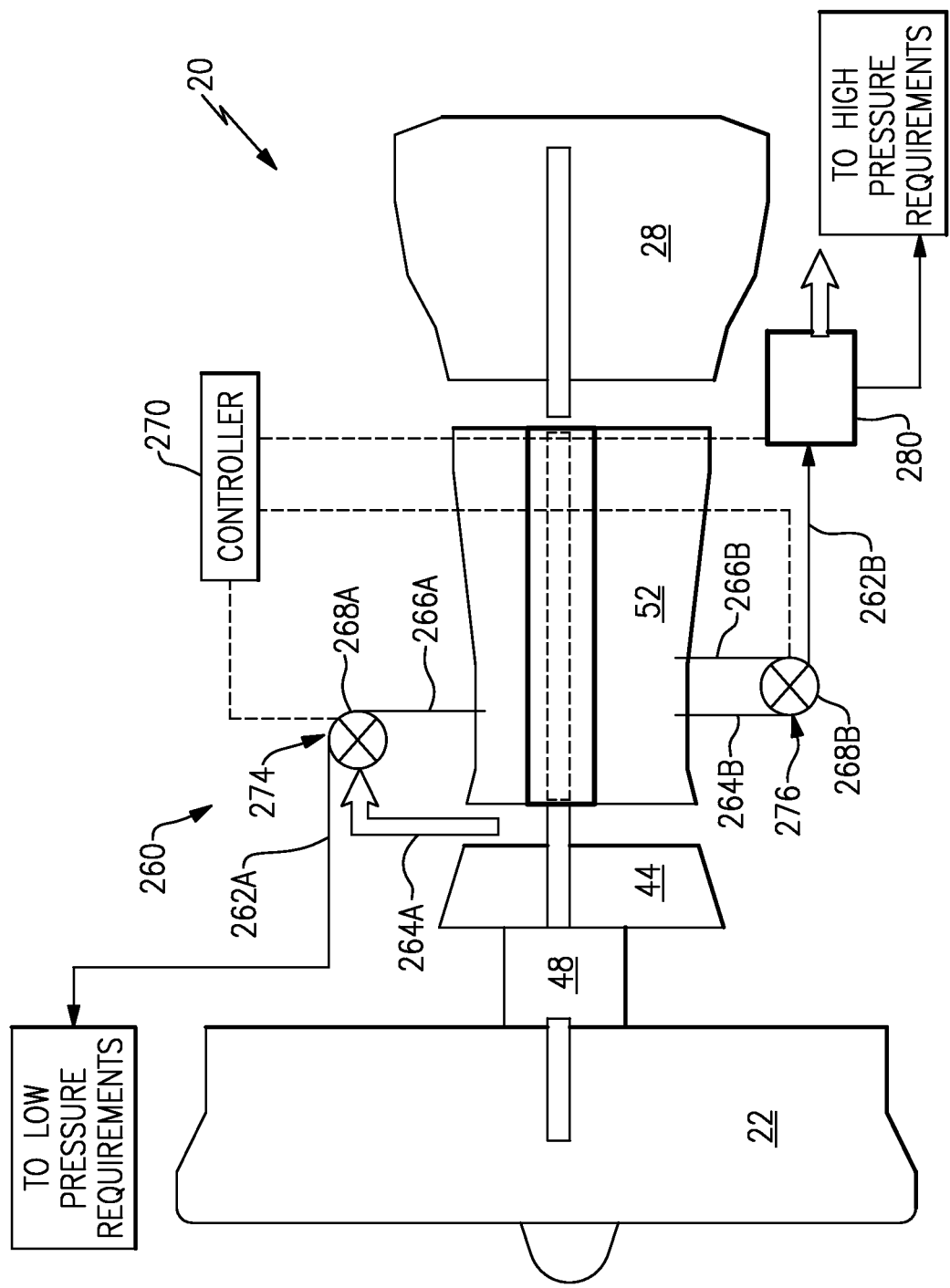
FIG. 5 illustrates yet another example buffer system that can be incorporated into a gas turbine engine.

FIG. 5 illustrates yet another example buffer system 260. In this example, the buffer system 260 is a two-circuit, multi-source buffer system that includes at least a first circuit 274 and a second circuit 276. Additional circuits could also be incorporated. Low pressure requirements of the gas turbine engine 20 can be fed with a first buffer supply air 262A from the first circuit 274, while high pressure requirements of the gas turbine engine 20 can be buffered with a second buffer supply air 262B from the second circuit 276. In other words, the first circuit 274 can buffer a first portion(s) of the gas turbine engine 20, while the second circuit 276 can buffer a second, different portion(s). Example components subject to low pressure requirements include bearing compartments in low pressure regions of the gas turbine engine 20, such as front or rear bearing compartments. Example components subject to high pressure requirements include bearing compartments in high pressure regions of the gas turbine engine 20, such as mid-engine bearing compartments.

In this example, the first circuit 274 is similar to the buffer system 60 of FIG. 3 and includes a first bleed air supply 264A, a second bleed air supply 266A and a valve 268A. The second circuit 276 includes a first bleed air supply 264B, a second bleed air supply 266B, a valve 268B and a conditioning device 280. In this non-limiting example, the conditioning device 280 cools the second buffer supply air 262B to an acceptable temperature for addressing higher pressure requirements. The conditioning device could include an air-to-air heat exchanger, a fuel-to-air heat exchanger, or any other suitable heater exchanger. The conditioning device 280 could also be a device other than a heat exchanger.

The second bleed air supply 266A of the first circuit 274 can be common to the first bleed air supply 264B of the second circuit 276. These sources can also be completely separate. In each of the first circuit 274 and the second circuit 276, the second bleed air supplies 266A, 266B are communicated as the buffer supply airs 262A, 262B for low power conditions of the gas turbine engine 20 and the first bleed air supplies 264A, 264B are communicated as the buffer supply airs 262A, 262B in response to high power conditions of the gas turbine engine 20. Example low power conditions include, but are not limited to, ground operation, ground idle and flight idle conditions. Example high power conditions include, but are not limited to, takeoff, climb, and cruise conditions. It should be understood that other power conditions are also contemplated as within the scope of this disclosure.

In one exemplary embodiment, the valves 268A, 268B select and communicate the first bleed air supplies 264A, 264B (which are relatively lower pressure bleed air supplies) as the buffer supply airs 262A, 262B in response to identifying a high power condition of a gas turbine engine 20. The second bleed air supplies 266A, 266B (which are relatively higher pressure bleed air supplies) are selected by the valves 268A, 268B and communicated as the buffer supply airs 262A, 262B in response to detecting a low power condition of the gas turbine engine 20. Both the lower bleed air supplies and the higher bleed air supplies are intended to maintain the same minimum pressure delta across the bearing compartment seals. Low power conditions require a higher stage pressurize source to contain the lubricant within the bearing compartment, while high power conditions require a lower pressure stage source. The buffer system 260 can use the lowest possible compressor stage to meet the pressure requirements in order to minimize supply temperature and any performance impact to the gas turbine engine 20.

The buffer system 260 can also include a controller 270 in communication with the valves 268A, 268B for selectively switching between the first bleed air supplies 264A, 264B and the second bleed air supplies 266A, 266B. A single controller 270 or multiple controllers could be utilized. The controller 270 can also command operation of the conditioning device 280 of the second circuit 276 for cooling the buffer supply air 262B. Alternatively, separate controllers can be used to control each of the first circuit 274, the second circuit 276 and the conditioning device 280.

Figure 6:
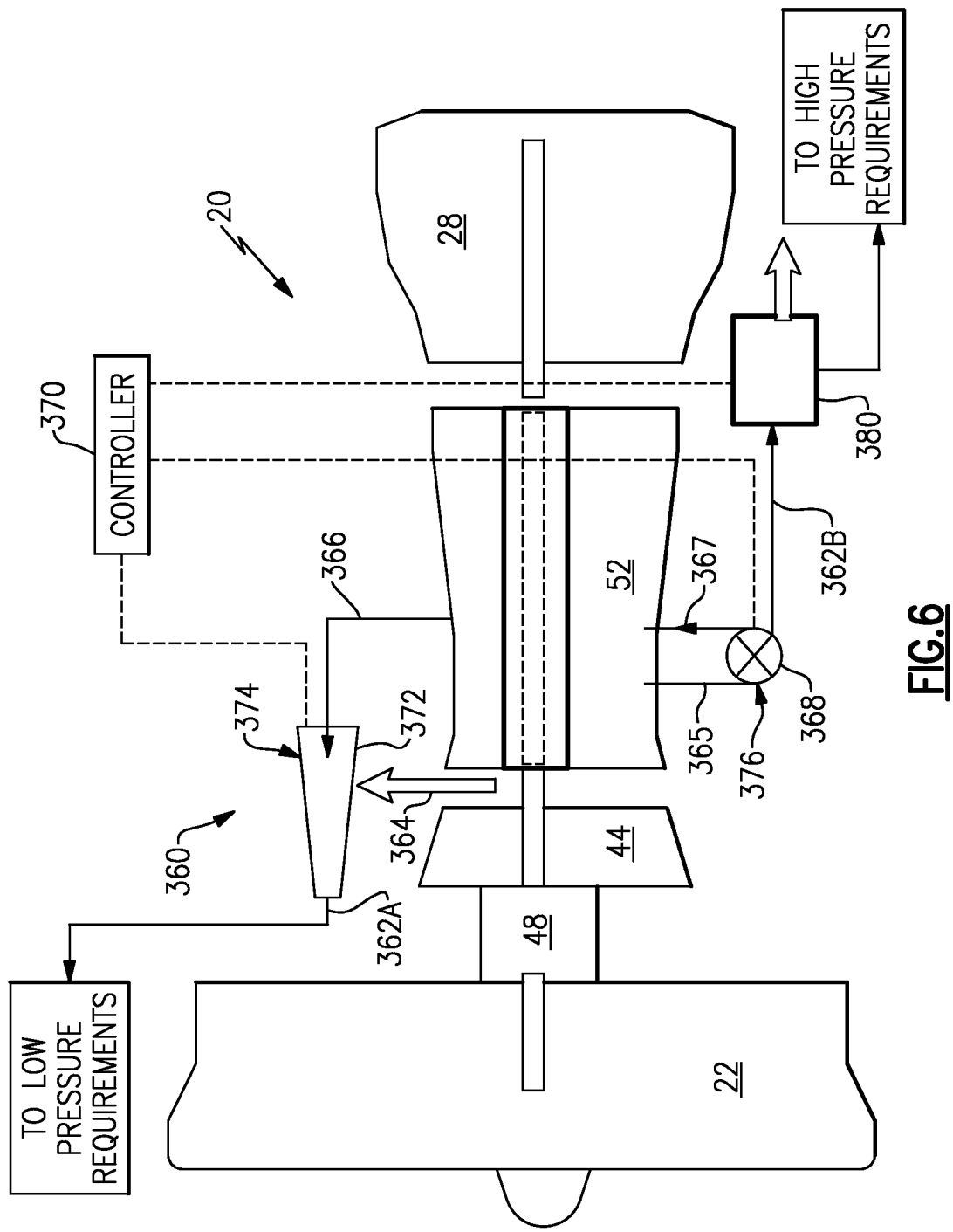
FIG. 6 illustrates another exemplary buffer system.

FIG. 6 illustrates another exemplary buffer system 360. Like the buffer system 260, the example buffer system 360 is a two-circuit, multi-source buffer system that includes at least a first circuit 374 and second circuit 376. Additional circuits could also be incorporated. Low pressure requirements of the gas turbine engine 20 can be fed with a first buffer supply air 362A from the first circuit 374, while high pressure requirements of the gas turbine engine 20 can be buffered with a second buffer supply air 362B from the second circuit 376. In other words, the first circuit 374 can buffer a first portion or portions of the gas turbine engine 20, while the second circuit 376 can buffer a second, different portion or portions.

Figure 7:
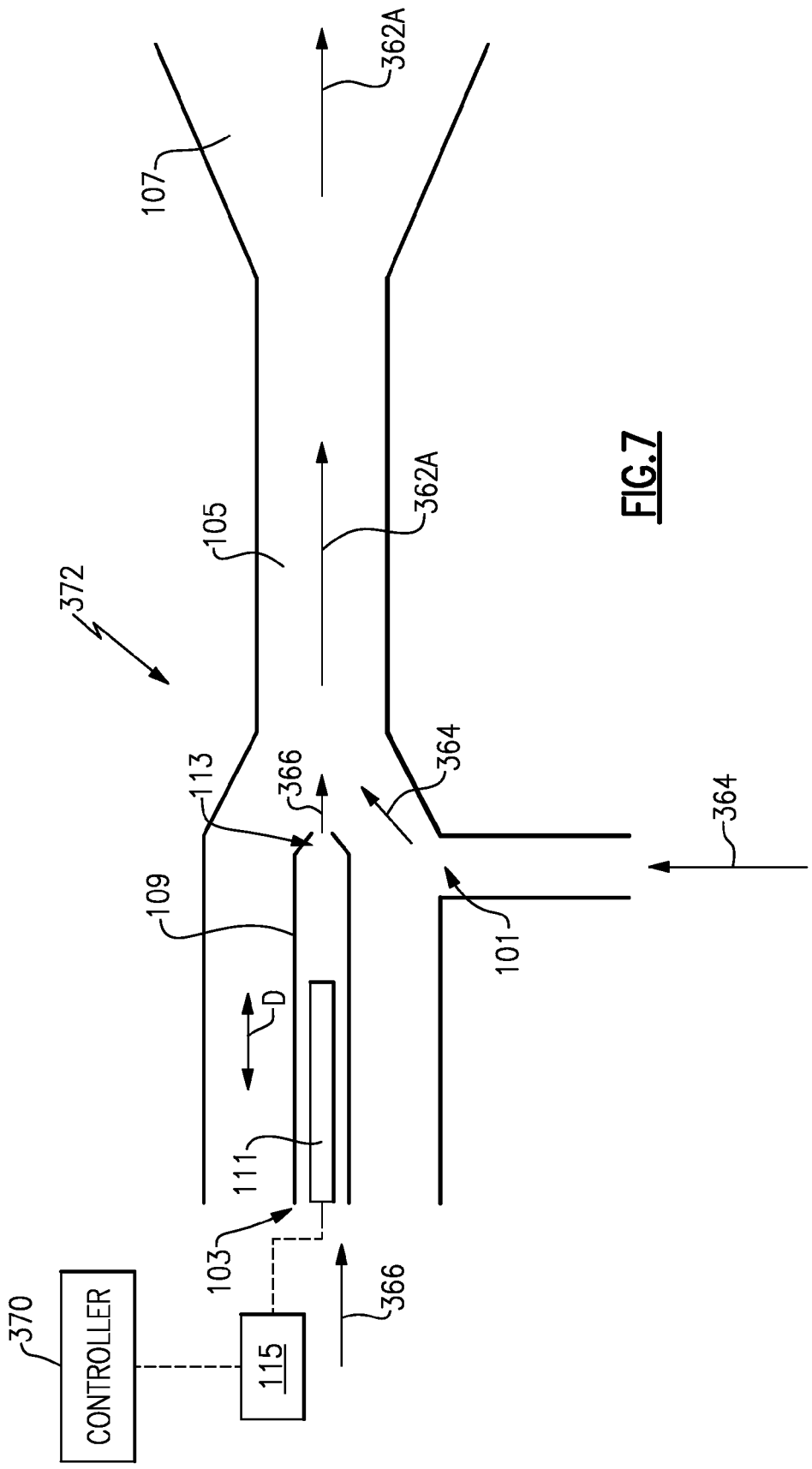
FIG. 7 illustrates an example ejector of a buffer system, such as the buffer system of FIG. 6.

In the exemplary embodiment of FIG. 6, the first circuit 374 is similar to the buffer system 160. In this exemplary embodiment, the first circuit 374 includes an ejector 372 that can selectively mix a first bleed air supply 364 having a first pressure with a second bleed air supply 366 having a second, higher pressure to render a buffer supply air 362A of an intermediate pressure. In one example, the ejector 372 is a variable area ejector that can be either actively or passively controlled. An example variable area ejector is shown in FIG. 7, the features of which are further discussed below. It should be understood that the ejector 372 could be used in the second circuit 376 or in both circuits 374, 376.

Augmentation of the first bleed air supply 364 prepares a buffer supply air 362A at an adequate pressure and temperature to pressurize any low pressure requirements of the gas turbine engine 20. The determination of whether or not to augment the first bleed air supply 364 with the ejector 372 is based on a power condition of the gas turbine engine 20, or alternatively, is based on direct pressure measurement. Gas turbine engine power conditions can include low power conditions and high power conditions. Example low power conditions include, but are not limited to, ground operation, ground idle and flight idle conditions. Example high power conditions include, but are not limited to, takeoff, climb, and cruise conditions. It should be understood that other power conditions are also contemplated as within the scope of this disclosure.

In one example, the first bleed air supply 364 is augmented by the ejector 372 in response to detecting a low power condition of the gas turbine engine 20 in order to communicate a buffer supply air 362A having adequate pressurization. The amount of augmentation performed on the first bleed air supply 364 can vary depending upon the type of power condition that is detected and pressure requirements. For example, in one embodiment, the first bleed air supply 364 is not augmented by the ejector 372 in response to detection of a high power condition of the gas turbine engine 20. In other words, the first bleed air supply 364 can be communicated as the buffer supply air 362A without any augmentation in response to some power conditions.

The exemplary second circuit 376 of the buffer system 360 can include a third bleed air supply 365 (which may or may not be common to either the first bleed air supply 364 or the second bleed air supply 366 of the first circuit 374), a fourth bleed air supply 367 (which may or may not be common to either of the first bleed air supply 364 or the second bleed air supply 366 of the first circuit 374), a valve 368 and a conditioning device 380. The conditioning device 380 can cool the second buffer supply air 362B to an acceptable temperature for addressing higher pressure requirements. The conditioning device 380 could include an air-to-air heat exchanger, a fuel-to-air heat exchanger, or any other suitable heat exchanger, or an ejector.

In one example, the fourth bleed air supply 367 is communicated as the buffer supply air 362B during low power conditions and the third bleed air supply 365 is communicated as the buffer supply air 362B during high power conditions of the gas turbine engine 20.

The buffer system 360 can also include a controller 370 in communication with the ejector 372 and the valve 368 for selectively controlling the communication of the buffer supply airs 362A, 362B at an appropriate pressure and temperature. A single controller or multiple controllers can be utilized. The controller 370 can also command operation of the conditioning device 380 of the second circuit 376 for cooling the buffer supply air 362B.

FIG. 7 illustrates the example ejector 372 of FIG. 6. It should be understood that the ejector 372 could be incorporated into one or more of the buffer systems detailed above. For example, the ejector 372 could be used in place of the ejector 172 of FIG. 4. The ejector 372 can be a variable area ejector that is either passively or actively controlled.

The example ejector 372 includes a first inlet 101 for receiving the first bleed air supply 364 (of a relatively lower pressure), a second inlet 103 for receiving the second bleed air supply 366 (of a relatively higher pressure), a mixing section 105, a diffuser section 107, and a nozzle 109. The second bleed air supply 366 is communicated through the second inlet 103 and into the nozzle 109. The nozzle 109 reduces the pressure of the second bleed air supply 366 below the static pressure of the first bleed air supply 364 by forcing it through an orifice 113 that causes it to accelerate. The first bleed air supply 364 is drawn through the first inlet 101 by the static pressure differential between itself and the accelerated second bleed air supply 366 and mixes with the second bleed air supply 366 in the mixing section 105 to render a buffer supply air 362A having an intermediate static pressure to the first bleed air supply 364 and the second bleed air supply 366. The diffuser section 107 decelerates the buffer supply air 362A prior to communicating the buffer supply air 362A to a low pressure requirement of the gas turbine engine 20 so that the mixed flow static pressure is above that of the first bleed air supply 364.

A plunger 111 can be movably positioned within the nozzle 109 to vary the orifice 113 of the nozzle 109. An actuator 115 is positioned to move the plunger 111 in the direction D. Varying the position of the plunger 111 within the nozzle 109 thereby controls the flow rate of the second bleed air supply 366 into the mixing section 105. A controller, such as the controller 370, can be programmed to selectively move the plunger 111 to vary the exit area 113 of the nozzle 109.

Although the different examples have a specific component shown in the illustrations, embodiments of this disclosure are not limited to those particular combinations. It is possible to use some of the components or features from one of the examples in combination with features or components from another one of the examples.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a compressor section;
a combustor in fluid communication with said compressor section;
a turbine section in fluid communication with said combustor;
a buffer system including a first circuit that supplies a first buffer supply air and a second circuit that supplies a second buffer supply air;
wherein said first circuit includes a first bleed air supply, a second bleed air supply and at least one of an ejector and a valve; and
wherein said second circuit includes a third bleed air supply, a fourth bleed air supply and at least one of an ejector and a valve.

2. The gas turbine engine as recited in claim 1, wherein one of said first circuit and said second circuit includes a conditioning device.

3. The gas turbine engine as recited in claim 1, wherein said ejector is a variable area ejector.

4. The gas turbine engine as recited in claim 1, wherein the gas turbine engine is a high bypass geared aircraft engine having a bypass ratio of greater than about six (6).

5. The gas turbine engine as recited in claim 1, wherein the gas turbine engine includes a low Fan Pressure Ratio of less than about 1.45.

6. The gas turbine engine as recited in claim 1, wherein said first circuit includes one of said ejector and said valve and said second circuit includes the other of said ejector and said valve.

7. A gas turbine engine, comprising:
a compressor section;
a combustor in fluid communication with said compressor section;
a turbine section in fluid communication with said combustor;
a buffer system including a first circuit configured to supply a first buffer supply air and a second circuit configured to supply a second buffer supply air;
said first circuit including a first bleed air supply, a second bleed air supply and an ejector configured to mix said first bleed air supply having a first pressure and said second bleed air supply having a second pressure that is greater than said first pressure to provide said first buffer supply air having an intermediate pressure to said first pressure and said second pressure; and
said second circuit including a third bleed air supply, a fourth bleed air supply, a valve and a conditioning device.

8. The gas turbine engine as recited in claim 7, wherein said valve is in communication with said third bleed air supply and said fourth bleed air supply.

9. The gas turbine engine as recited in claim 7, wherein said valve is configured to select between said third bleed air supply and said fourth bleed air supply to communicate said second buffer supply air.

10. The gas turbine engine as recited in claim 7, wherein said conditioning device is configured to cool said second buffer supply air.

11. The gas turbine engine as recited in claim 7, wherein said first buffer supply air is communicated to a first portion of the gas turbine engine and the second buffer supply air is communicated to a second portion of the gas turbine engine.

12. The gas turbine engine as recited in claim 11, wherein said first portion of the gas turbine engine includes front and rear bearing compartments and said second portion of the gas turbine engine includes mid-engine bearing compartments.

13. The gas turbine engine as recited in claim 7, comprising a controller in communication with said ejector and said valve and configured to control communication of said first buffer supply air and said second buffer supply air at desired pressures and temperatures.

14. The gas turbine engine as recited in claim 13, wherein said controller is configured to command operation of said conditioning device for selectively cooling said second buffer supply air.

15. A gas turbine engine, comprising:
a compressor section;
a combustor in fluid communication with said compressor section;
a turbine section in fluid communication with said combustor;
a buffer system including a first circuit configured to supply a first buffer supply air to front and rear bearing compartments of the gas turbine engine and a second circuit configured to supply a second buffer supply air to mid-engine bearing compartments of the gas turbine engine;
said first circuit including a first bleed air supply, a second bleed air supply and at least one of an ejector and a valve; and
said second circuit including a third bleed air supply, a fourth bleed air supply and at least one of an ejector and a valve.

* * * * *